United States Patent [19]
Lee et al.

[11] Patent Number: 5,791,522
[45] Date of Patent: Aug. 11, 1998

[54] MODULAR NARROW PROFILE FOAM DISPENSER

[75] Inventors: William Lee, Trumbull; John J. Corrigan, III, Washington; George T. Bertram, Newtown; Robert N. Fleming, New Milford, all of Conn.

[73] Assignee: Sealed Air Corporation, Saddle Brook, N.J.

[21] Appl. No.: 565,021

[22] Filed: Nov. 30, 1995

[51] Int. Cl.⁶ ............................................... B67D 5/60
[52] U.S. Cl. ................................. 222/145.5; 222/504
[58] Field of Search ........................... 222/145.5, 504, 222/333; 239/343

[56] References Cited

U.S. PATENT DOCUMENTS

| | | |
|---|---|---|
| 3,687,370 | 8/1972 | Sperry . |
| 3,945,569 | 3/1976 | Sperry . |
| 4,023,733 | 5/1977 | Sperry . |
| 4,159,079 | 6/1979 | Phillips, Jr. . |
| 4,426,023 | 1/1984 | Sperry et al. . |
| 4,469,130 | 9/1984 | James et al. . |
| 4,469,251 | 9/1984 | Sperry et al. . |
| 4,568,003 | 2/1986 | Sperry et al. . |
| 4,674,268 | 6/1987 | Gavronsky et al. . |
| 4,800,708 | 1/1989 | Sperry . |
| 4,854,109 | 8/1989 | Pinarer et al. . |
| 4,913,317 | 4/1990 | Wernicke ................ 222/145.5 |
| 4,993,596 | 2/1991 | Brown .................... 222/145.5 |
| 5,180,082 | 1/1993 | Cherfane ................ 222/504 |
| 5,186,905 | 2/1993 | Bertram et al. . |
| 5,215,226 | 6/1993 | Bertram et al. . |
| 5,246,143 | 9/1993 | Cherfane . |
| 5,255,847 | 10/1993 | Sperry et al. . |
| 5,339,991 | 8/1994 | Snyder ................... 222/145.5 |
| 5,375,743 | 12/1994 | Soudan ................... 222/504 |
| 5,376,219 | 12/1994 | Sperry et al. . |

*Primary Examiner*—Philippe Derakshani
*Attorney, Agent, or Firm*—Bell, Seltzer, Park & Gibson, P.A.

[57] ABSTRACT

A dispenser for dispensing foamable compositions includes a first module comprising a first housing, a fluid flow fitting in the first housing, a shutoff valve in the first housing and in fluid communication with the fluid flow fitting. The dispenser further includes a second module comprising: a second housing, a valving chamber in the second housing for receiving fluid from the shutoff valve and the fluid flow fitting; and an attachment for securing the first and second modules to one another with the valving chamber in fluid communication with the shutoff valve and the fluid flow fitting so that foam precursors can travel from the foam fittings to the valving chamber, and be dispensed from the chamber to form foam.

12 Claims, 5 Drawing Sheets

MODULAR NARROW PROFILE FOAM DISPENSER

FIELD OF THE INVENTION

This invention relates to cushioned packaging apparatus and techniques and, in particular, relates to a device for forming foam cushioning of the type in which a foamable composition is dispensed into a plastic bag that is in turn placed into a container that carries an object to be cushioned. The foamable composition in the bag generates gases while hardening and results in a hardened foam cushion that surrounds the packaged object in customized fashion.

BACKGROUND OF THE INVENTION

The present invention relates to the use of foamable compositions for packaging purposes. In a number of packaging applications, fragile articles or those otherwise needing protection from undesired movement or breakage, particularly items with irregular shapes and sizes, have been packed in loose, friable or dunnage-type materials or in protective foamed polymer packaging materials, such as injection molded styrofoam, styrofoam chips, or other similar materials.

The present invention relates to foam-in-place packaging, a technique that provides a useful alternative for packaging fragile or other items.

As its name implies, foam-in-place packaging comprises generating the foam cushioning while the articles to be protected are being packaged. For example, when certain chemicals are mixed, they form polymeric products while at the same time generating gases, such as carbon dioxide and water vapor. If such chemicals are selected as being those that harden relatively quickly, they can be used to form hardened polymer foams in which the foam is produced by the gaseous carbon dioxide and water vapor leaving the mixture as it hardens. Typical foamable compositions include urethane precursors which, when mixed, generate polyurethane, carbon dioxide, and water vapor. As the urethane forms and hardens, these gases are concurrently generated so that by the time the urethane sets (generally a relatively short period of a few minutes or less) it takes the form of a polymer foam that has expanded to fill the void spaces in the container and to thereby cushion the item being packaged.

One technique for foam-in-place packaging is to place the object to be packaged in a container, cover it with a polymer film or other material which will protect it from liquids, inject a certain amount of foamable composition into the remainder of the container, and then close the container. As the composition foams, it fills the remainder of the container, forming a custom-shaped foam cushion surrounding the article. In such circumstances, foam-in-place packaging can be accomplished with a supply of foamable chemicals, usually two, and an injection dispenser connected to the supplies of the respective chemicals. The chemicals are mixed within the dispenser to form the foamable composition. Examples of earlier versions of such dispenser include those described in U.S. Pat. Nos. 3,687,370; 3,945,569; 4,023,733; 4,159,079; and 4,426,023.

For larger volume packaging operations, i.e., those requiring a number of foam protective packages to be made in relatively rapid succession, a number of automated devices have been developed and are assigned to the assignee of the present invention. Exemplary devices are described and claimed in U.S. Pat. Nos. 4,674,268; 4,800,708; and 4,854,109; and 5,376,219.

As set forth in the above U.S. patents for the larger volume packaging devices, foam is injected between running webs of plastic film material. In some circumstances, two separate webs are used and then sealed along each longitudinal edge and each transverse edge to form the bag. In other circumstances, a tube can be used so that only transverse seals are required to form a bag. In yet other circumstances, a C-folded stock material can be used so that only one side edge needs to be sealed along with the transverse seals. In every one of these cases, the devices that dispenses the foam must be physically placed either between the running webs, or very closely adjacent to the point at which the webs meet. If the dispenser is positioned close to the point at which the webs meet, it is not entirely enclosed by the webs, and will tend to allow foam to escape and splash in undesired locations. As those familiar with such systems are well aware, the nature of the foamable compositions is such that they are relatively sticky and tend to become almost ubiquitous in their unwanted appearance around the packaging device if not otherwise controlled.

One solution to the splashing problem is to place the dispenser between the running webs of film material. In such arrangements, if the foamable composition splashes as it is being dispensed, it will much more likely be captured within the bag being formed by the running webs of plastic film.

The presence of the dispenser between the running webs, however, raises a different set of problems. Specifically, because the webs are generally running from a roll of stock material, they are in flattened orientation and are being advanced at relatively high speeds between various drive and driven roller systems as described in the aforementioned patents. If these webs are forced to travel around and enclose a dispenser, they will typically need to run in a path that is initially planar, is then diverted by the physical size of the dispenser, and is then returned to a more flattened, planar path. The change in the film's path from a planer flattened orientation to one that must pass around a dispenser, however, raises a number of problems in "tracking" the plastic film material. Specifically when the plastic film is diverted from its planar path, and it in turn tends to become dislodged from its running path and in turn becomes dislodged from the roller systems that drive it and that also seal the longitudinal edges and the transverse edges. When the plastic film becomes dislodged in that manner, operation of a dispensing device typically must be halted and an operator must disengage the rollers, straighten out the webs, reengage the rollers, and restart the process.

Accordingly, the need exists for dispenser systems which can more conveniently be maintained entirely within or between running webs, tubes, or folded sheets of film, so as to dispense foam without splashing it elsewhere, and yet at the same time which will minimize the disruption of the path of travel of the running webs during the bag making process.

As an additional problem with foam-in-place packaging, and as hinted at by the description of foam and its characteristics set forth above, the nature of the foam and the relatively sophisticated devices that dispense it raise the need for both periodic preventative maintenance, as well as unexpected repair. In higher volume packaging operations, any such interruption for maintenance can represent a significant loss of efficiency while the packaging device is out of normal operation and being repaired or maintained. As the patents for dispensers and other systems demonstrate, the devices are relatively sophisticated, and thus the preventative maintenance and repair can be relatively time consuming.

Accordingly, there exists a need for a dispenser or dispenser system in which the disassembly and reassembly required to repair one or more parts (particularly the cartridges), can be streamlined and accomplished more quickly.

OBJECT AND SUMMARY OF THE INVENTION

Therefore, it is an object of the present invention to provide a dispenser for dispensing foamable compositions that is particularly useful for apparatus where running webs must be kept adjacent to one another and which provides advantages in service, maintenance, and repair.

The invention meets this object with a dispenser for dispensing foamable compositions which comprises first and second modules. The first module includes a first housing, a fluid flow fitting in the first housing, and shutoff valve means in the first housing and in fluid communication with the fluid flow fitting. The second module includes a second housing, and a valving cartridge in the second housing for receiving fluid from the shutoff valve means and from the fluid flow fittings. Means are included for securing the first and second modules to one another with the valving cartridge in fluid communication with the shutoff valve means and thus with the fluid flow fitting so that foam precursors can travel from the foam fittings to the valving cartridge and be dispensed from the cartridge to form foam.

In another aspect, and in order to minimize the dispenser's profile, the flow axes of the fluid flow fittings are substantially coplanar with one another, the flow axes of the fluid passages in the shutoff valve means are substantially coplanar with the axes of the fluid flow fittings, and the cartridges positioned with its dispensing axis substantially coplanar with the axis of said fluid flow fittings and with the axis of the fluid flow passages in the shutoff valve means.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments and wherein:

DETAILED DESCRIPTION

Figure 1:
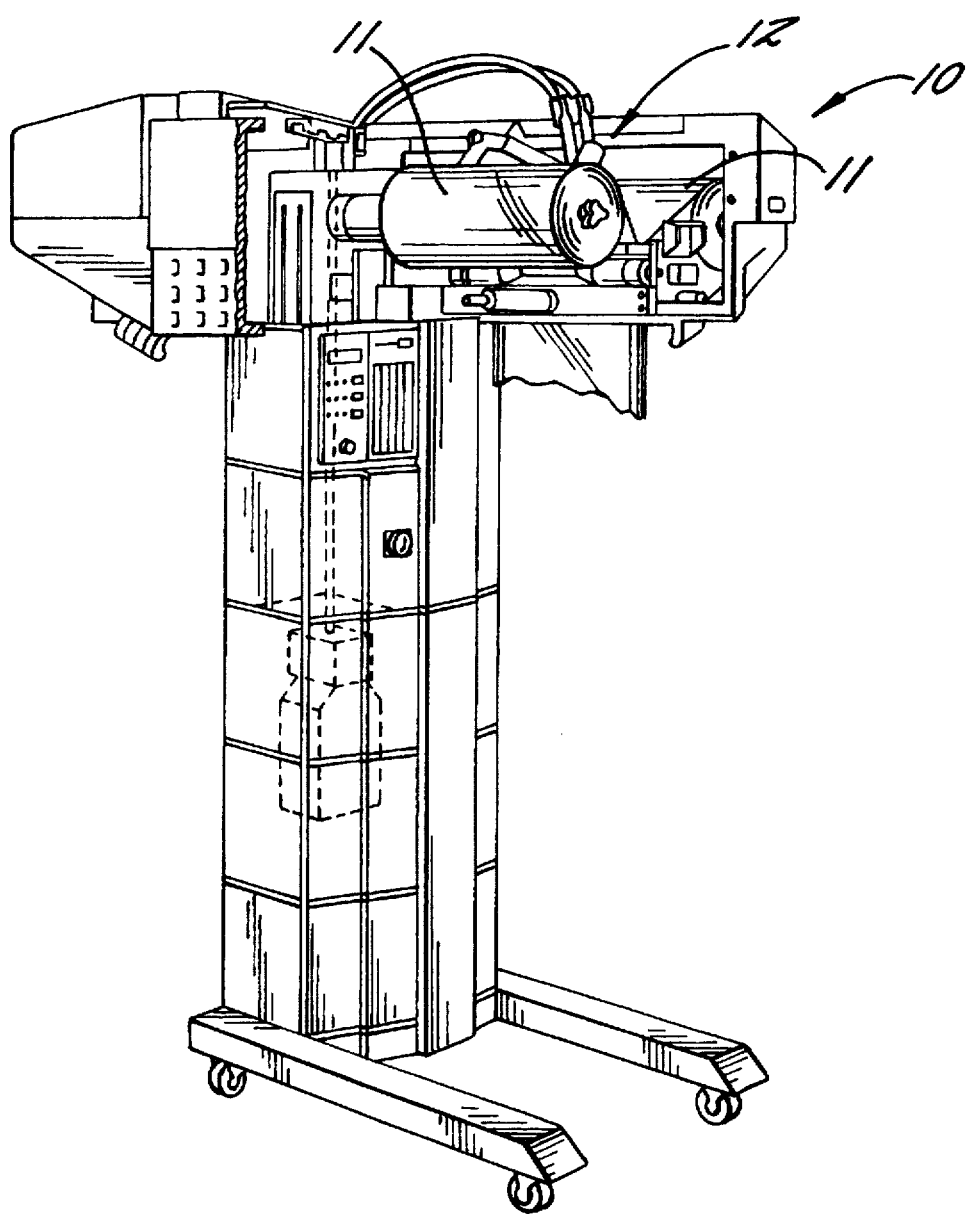
FIG. 1 is a perspective view of a device that can form foam cushions in relatively rapid succession for packaging purposes.

The present invention is a dispenser for dispensing foamable compositions. As set forth in the background, such dispensers are often incorporated into large, relatively high speed packaging devices such as the device broadly designated at 10 in FIG. 1. As illustrated in FIG. 1, the device 10 is the type that uses two separate rolls 11 of plastic sheet material to form bags into which a foamable composition is injected using the dispenser broadly designated at 12. As FIG. 1 illustrates, the plastic sheet material 11 is placed in face to face relationship to form a bag, but at some point must be separated sufficiently for the dispenser 12 to have a position from which it can dispense foam between the sheets 11.

Figure 2:
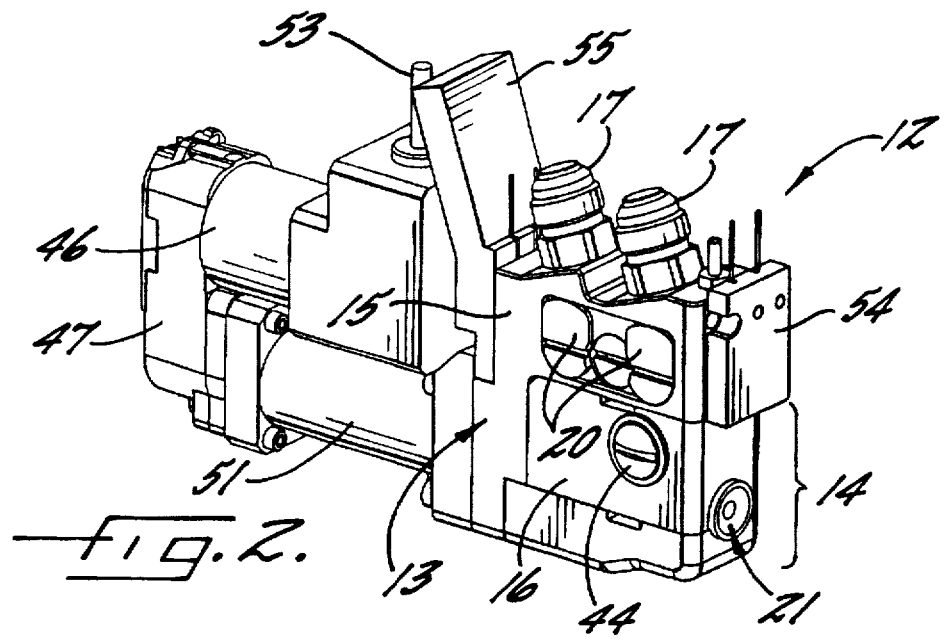
FIG. 2 is a perspective view of the dispenser according to the present invention.
Figure 3:
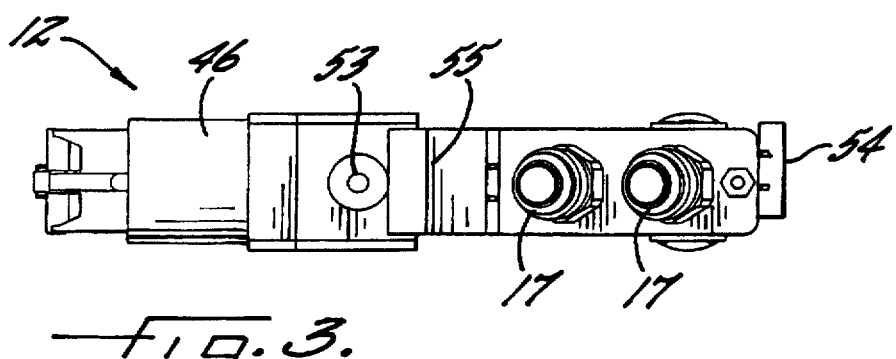
FIG. 3 is a top plan view of the dispenser of FIG. 2.
Figure 4:
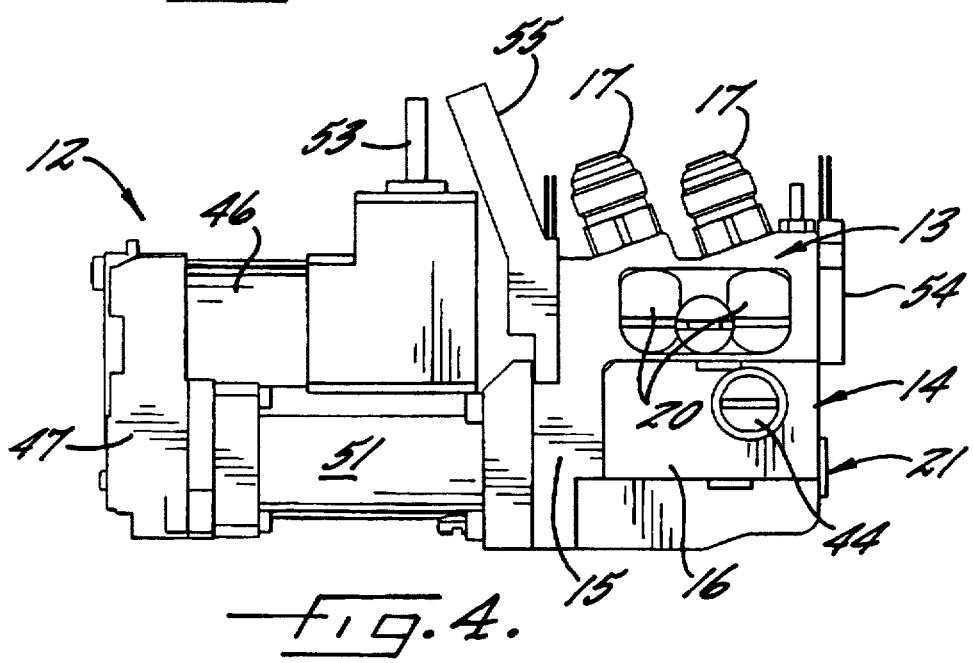
FIG. 4 is a side elevational view of the dispenser of FIGS. 2 and 3.

FIGS. 2, 3, and 4 illustrate the dispenser 12 of the present invention in more detail. They illustrate that the dispenser comprises a first module broadly designated at 13 and a second module broadly designated at 14. The first module 13 has a first housing 15, and the second module 14 has a second housing 16. The first housing 15 includes a fluid flow fitting, and preferably two fluid flow fittings, which are shown as the threaded hose fittings 17 in the drawings. As noted above, one of the common ways of forming foam is to use two foam precursor materials which when mixed together form a foaming composition, and thus the dispenser 12 will commonly include two fittings, although it will be understood that the number of fittings is not limited to two in other circumstances.

The first module further comprises shutoff valve means (illustrated in more detail in FIG. 5) but for which the valve handles are shown at 20 in FIGS. 2 and 4.

The second module 14 and its housing 16 contain a valving chamber which in the illustrated embodiments comprises the valving (or "injection") cartridge broadly designated at 21 in FIGS. 2 and 4. As all of the figures illustrate, the valving cartridges are inside (i.e. predominantly within or enclosed by) the second housing 16 for receiving fluid from the shutoff valve means and the fluid flow fittings 17. It will be understood that although the valving chamber is illustrated herein as the cartridge 21, a self-contained chamber formed from or within the module itself would represent an equivalent structure and would perform an equivalent function.

Figure 5:
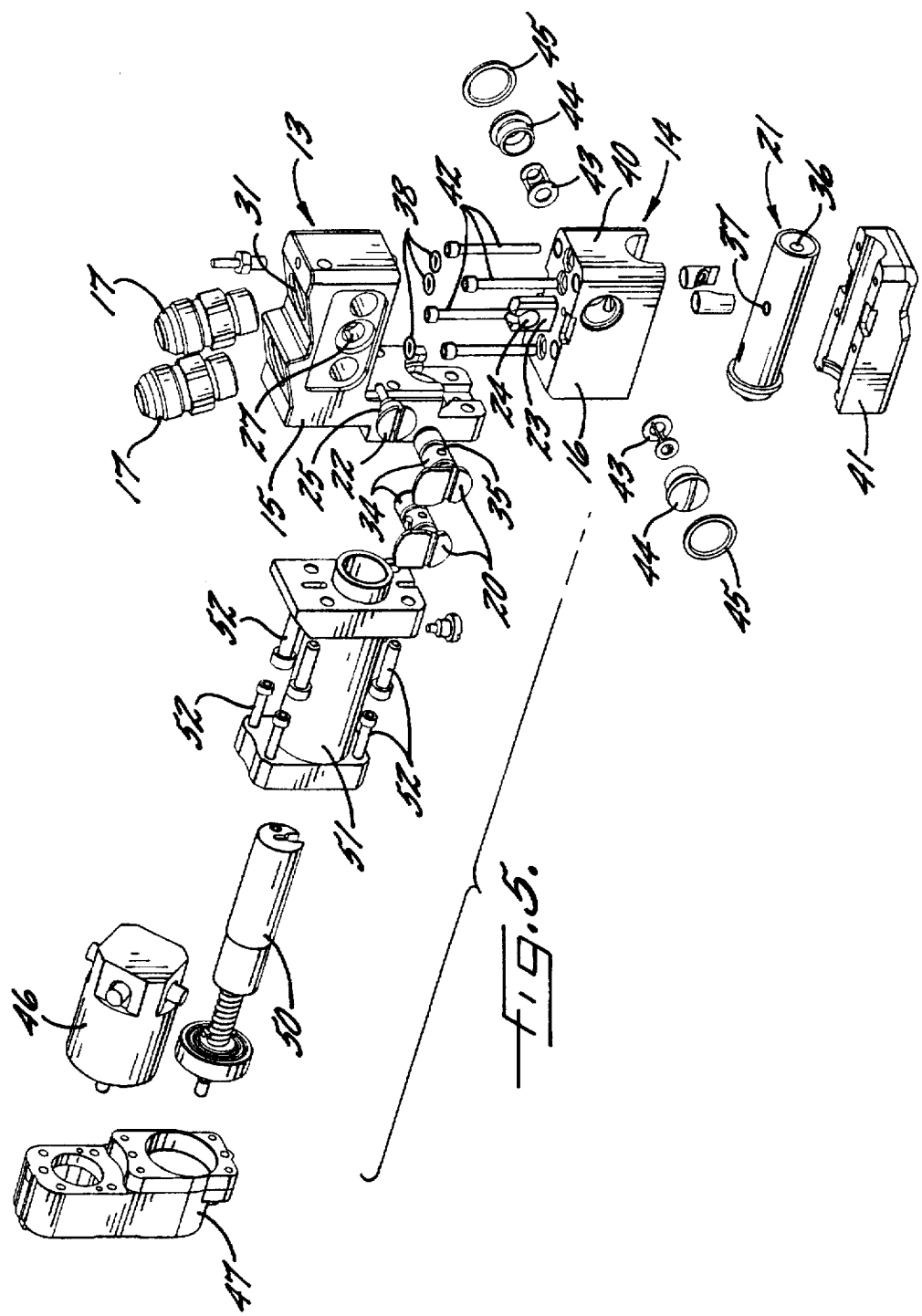
FIG. 5 is an exploded perspective view of a dispenser according to the present invention.
Figure 6:
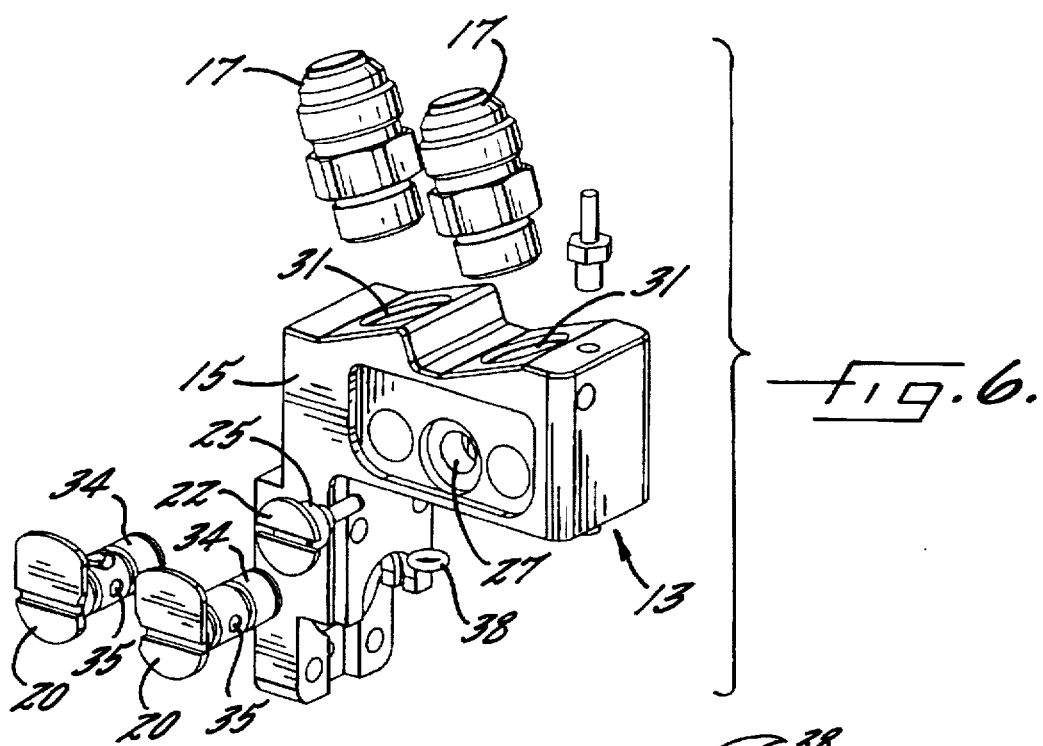
FIG. 6 is an enlarged partially exploded view of one of the modules of the dispenser of the present invention.
Figure 7:
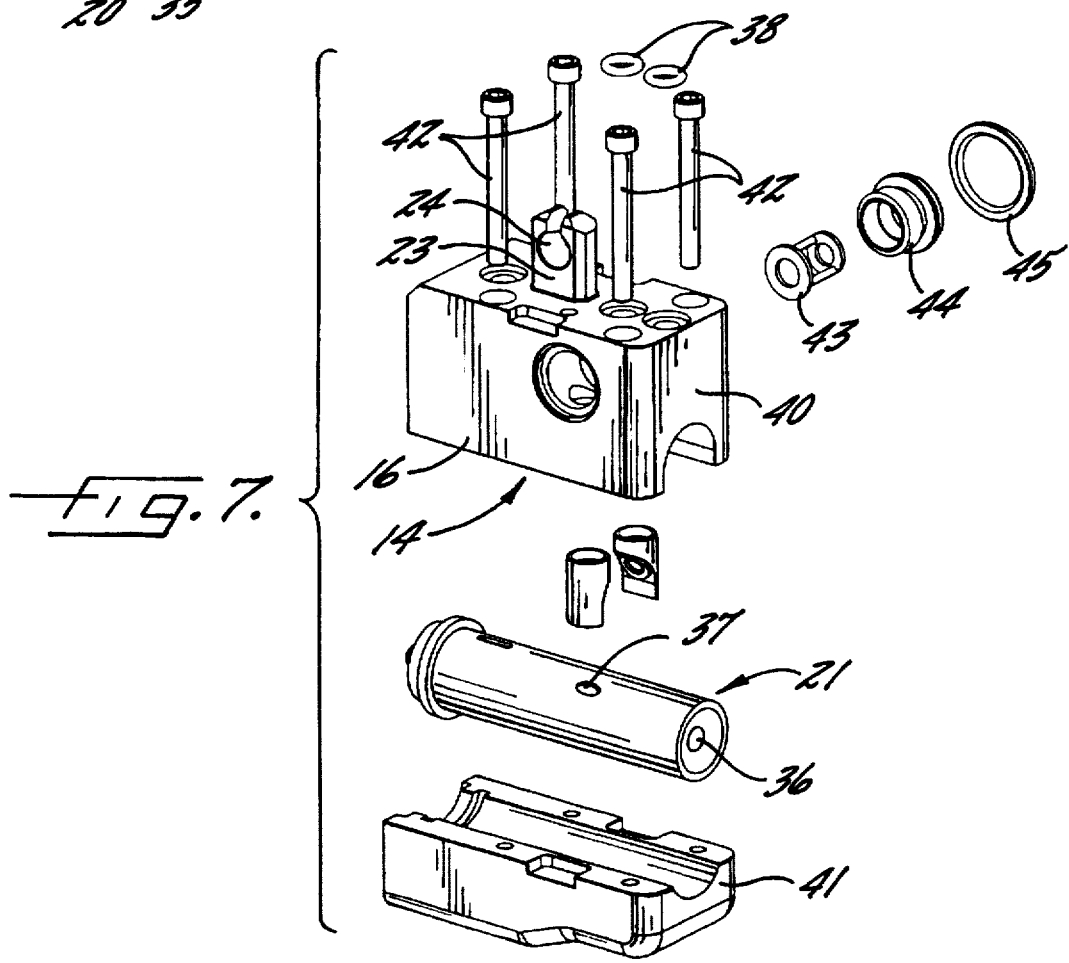
FIG. 7 is another enlarged perspective view of the other module of the dispenser of the present invention.
Figure 8:
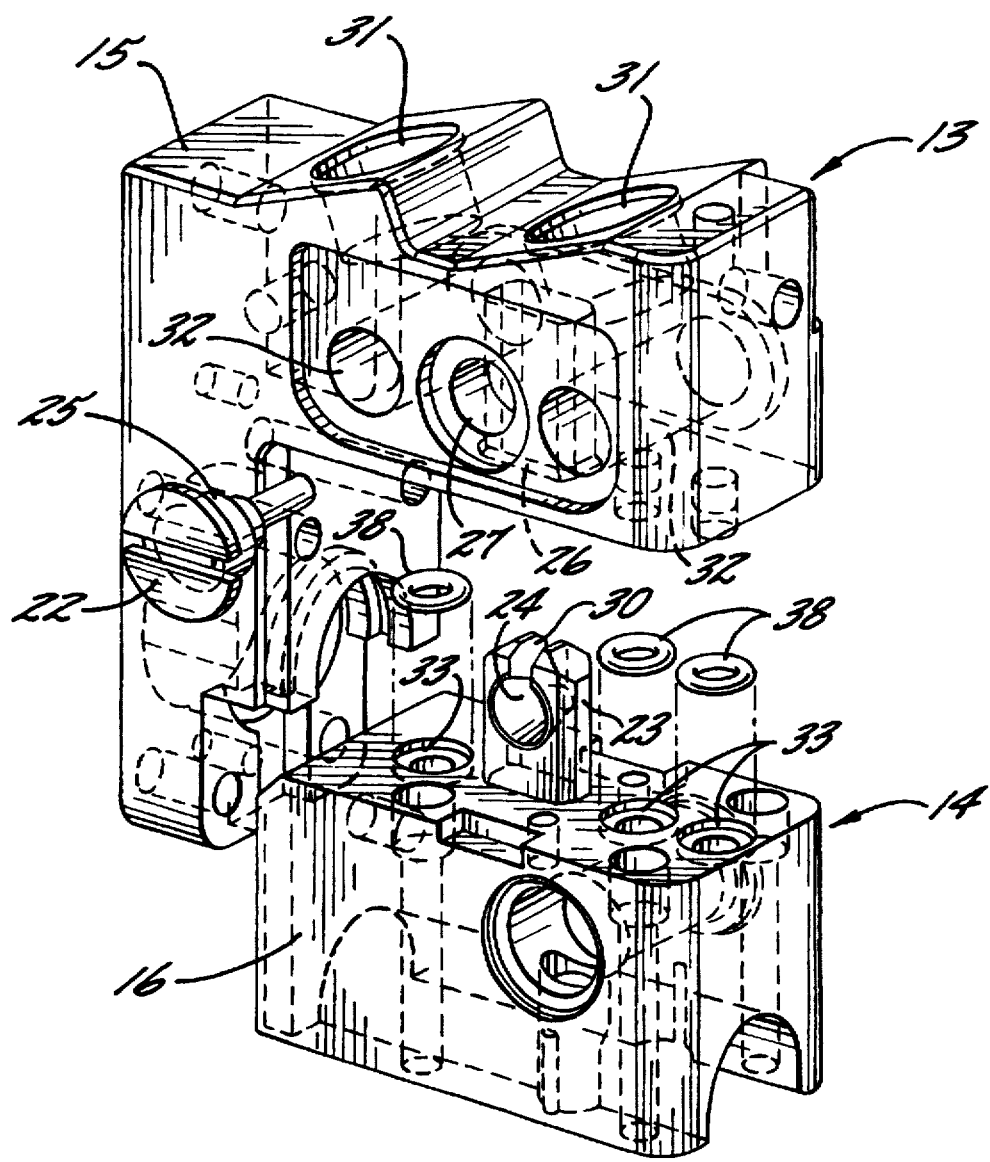
FIG. 8 is a perspective view of portions of both modules of the dispenser of the present invention and particularly illustrating some of the interior flow passages.

FIG. 5 illustrates that the dispenser further comprises means shown as the bolt 22 and the post 23 for securing the first and second modules to one another with the valving cartridge 21 in fluid communication with the shutoff valve means and the fluid flow fittings 17 so that foam precursors can travel from the foam fittings 17 to the valving cartridge 21 and be dispensed from the cartridge 21 to form foam. As illustrated in FIGS. 5, 6 and 7, the post 23 contains a female frustoconical opening 24 and the bolt 22 likewise includes a male frustoconical portion 25. FIG. 8 shows that the housing 15 of the first module 13 includes an aperture 26 for receiving the post 24 into the first housing 15. Similarly, the housing 15 contains a bolt opening 27 (perhaps most clearly seen in FIG. 6) into which the bolt 22 and its frustoconical portion 25 can be received to in turn engage the frustoconical portion 24 on the post 23 when the housing 15 and the housing 16 are in engagement with one another to secure the post in the aperture and thus secure the modules together. FIGS. 5, 7 and 8 illustrate that the post 23 includes an open portion 30 at the top, the purpose of which is to allow the upper portions of the post 23 to be forced apart as the bolt 22 is tightened to thus more securely hold the two modules 13 and 14 together.

FIGS. 5 and 8 illustrate that all of the various portions of the dispenser are in fluid communication with one another. Specifically, the hose fittings 17 fit into openings 31 in the first module 13 and its housing 15. The interior lines in FIG. 8 show that these hose fittings 17 are in turn in communication with the valve chambers 32 of the shutoff valve means, and with the housing 16 of the second module 14 through the openings 33 in upper portions of the housing 16, and from there through interior passageways in the second housing 16 to the valving cartridge 21. Accordingly, in preferred embodiments, both the first housing 15 and the second housing 16 comprise solid polygons with fluid flow passages therethrough to define the fluid flow path of the foam precursors from a supply (usually hoses) to the cartridge 21 for dispensing. The particular material from which the housings are formed is not critical, other than that the material should be able to withstand the foam precursor chemicals. A number of metals are appropriate, as are certain engineering plastics. Plastics also offer the advantage of lighter weight, and parts made of plastic (polymers) can often be molded and thus formed into complex shapes more easily than metals which in many cases would have to be machined (e.g. cut and drilled) to the same configurations.

The nature and operation of the shutoff valve is further illustrated in FIGS. 5 and 6 which show that the valve handles 20 are attached to valve stems 34 which in turn carry fluid passages 35. In FIGS. 5 and 6, the valve handles 20 and valve stems 34 are oriented with the valve passages 35 perpendicular to the direction of flow of fluid from the hose fitting 17 and through the housing 15. In order to open the valves, the handles 20 must be rotated 90° perpendicularly and as seen from their shape and position with respect to the housing 15, are generally rotated inwardly; i.e. the left hand valve handle 20 is rotated clockwise, and the right hand valve handle 20 is rotated counterclockwise.

When the valve handles 20 are rotated in this manner, they overlap and cover the top of the bolt 22 that helps secure the modules together. Alternatively, the bolt 22 can not be removed, and the modules cannot be separated from one another, until the valve handles 20 are in the closed position rather than the open position. Accordingly, this structure provides the shutoff valve with the means for preventing fluid flow when the first module and the second module are separated from one another, and for preventing the first and second modules from being separated from one another when the shutoff valve is open.

The valve cartridge 21 is of the type described in a number of prior patents, including, but not limited to, cartridges described in U.S. Pat. Nos. 4,469,251; 4,568,003; 5,186,905; and 5,255,847. In general, however, it forms a cylinder (or an equivalent shape) with an axial opening 36 at one end. An axial valving rod (not shown) is movable into and out of the opening 36 to open and close the cartridge 21 to the flow of foamable compositions. The cartridge includes a mixing chamber (also not shown) in fluid communication with the opening when the opening is opened by the valving rod. A pair of openings, one of which is shown at 37 in FIG. 5, on the circumference of the cylinder are in communication with the mixing chamber for permitting two separate foam precursor compositions to enter the cylinder, become mixed, and be dispensed as a foamable composition.

FIGS. 5, 6, and 7 also illustrate that the second housing 16 can comprise respective upper and lower portions 40 and 41 with the injection cartridge 21 therebetween and wherein the upper and lower portions further comprise means shown as the bolts 42 for securing the cartridge 21 between the upper and lower portions 40 and 41. These figures also illustrate several o-rings 38 that can be included as desired or necessary to help seal portions of the respective passageways.

In another aspect, the dispenser offers a particularly narrow profile that minimizes the degree to which plastic film traveling past the dispenser will be laterally displaced from its otherwise straight path of travel, and thus minimizing any associated problems with such displacement. In this aspect, the flow axes of the hose fittings are substantially coplanar with one another as illustrated in the various drawings. Similarly, the fluid flow passages defined by the elements of the shutoff valve means (20, 34, and 35) are similarly substantially coplanar with the axes of the fluid flow fittings 17, and the dispensing axes of the cartridge 21 is similarly coplanar with both the axes of the fluid flow fittings and the axes of the fluid flow passages in the valve means.

Because all of these elements are located in substantially the same plane, the overall profile of the dispenser 12 can be minimized, thus correspondingly minimizing the displacement of film that passes over the dispenser 12. If desired, the dispenser 12 can be further enclosed in a custom housing that would also facilitate the passage of plastic film over the dispenser without disturbance.

FIG. 5 illustrates that the dispenser 12 includes other advantageous details such as the filters 43 that fit into the upper portion 40 of the second housing 16. The filters are held in place by appropriate bolts 44 and retaining rings 45 as also shown in FIG. 5.

In preferred embodiments, the dispenser is electrically driven, and thus comprises an electric motor 46 to drive the valving cartridge 21 and a transmission to drive the cartridge from the motor 46. In the illustrated embodiment, the transmission comprises the gear box 47, and the shaft assembly 50. It will be understood that the rotation of the shaft 50 by the motor 46 and transmission 47 serves to move the valving rod in the valving cartridge in a lateral fashion to open and close the foam dispensing opening 36 in the cartridge 21. FIG. 5 also shows an additional housing assembly 51 which carries portions of the shaft assembly 50 and also physically connects the gear box 47 to the first module 13 of the dispenser in conventional fashion using, for example, the bolts 52 illustrated in FIG. 5.

FIGS. 2, 3 and 4 also illustrate that the dispenser can include a mounting fixture such as the post 53 and the faceplate 54, and the hose support plate 55. There are a number of systems for delivering foam precursors in hoses to fittings such as the threaded hose fittings 17, and these are generally well understood in this art and will not otherwise be described in detail herein.

In another aspect, the invention comprises a method of forming foam cushions for packaging purposes which comprises advancing a pair of sheets of plastic material in face-to-face contact along a predetermined path of travel; separating the sheets from their face-to-face contact, directing the separated sheets along opposite sides of a narrow foam injection device while minimizing the angle of diversion of the separated sheets from their original path of travel, injecting a foamable composition between the separated sheets, and redirecting the sheets in the face-to-face relationship while sealing the unsealed edges of the sheets to form a bag containing a foamable composition.

In the drawings and specification, there have been disclosed typical preferred embodiments of the invention, and although specific terms have been employed, they have been used in a generic and descriptive sense only and not for purposes of limitation, the scope of the invention being set forth in the following claims.

That which is claimed is:

1. A dispenser for dispensing foamable compositions and comprising:
   a housing with two fluid flow fittings, each said flow fitting defining a flow axis, and with said flow axes of said fluid flow fittings being substantially coplanar with one another;
   a shutoff valve in said housing, said shutoff valve having a respective fluid flow passage in fluid communication with each of said fluid flow fittings, and with said flow axes of said fluid passages in said shutoff valve being substantially coplanar with said flow axes of said fluid flow fittings; and
   an injection cartridge in said housing in fluid communication with said shutoff valve and said fluid flow fittings, said cartridge being positioned with its dispensing axis substantially coplanar with both of said axes of said fluid flow fittings in said housing and coplanar with both of said flow axes of said valve.

2. A dispenser according to claim 1 wherein said shutoff valve comprises means for preventing fluid flow when said first module and said second module are separated from one another, and means for preventing said first and second modules from being separated from one another when said shutoff valve is open.

3. A dispenser according to claim 1 wherein said second housing comprises respective upper and lower portions with said cartridge therebetween, and wherein said upper and lower portions further comprise means for securing said cartridge between said upper and lower portions.

4. A dispenser according to claim 1 wherein said second housing further comprises fluid filters between said shutoff valve and said cartridge.

5. A dispenser according to claim 1 further comprising:
   an electric motor; and
   a transmission driven by said motor for opening and closing said injection cartridge.

6. A dispenser according to claim 1 wherein said first housing comprises a solid polygon with fluid flow passages therethrough.

7. A dispenser according to claim 1 wherein said second housing comprises a solid polygon with fluid flow passages therethrough.

8. A dispenser according to claim 1 wherein said modules securing means comprises a post on said second housing, an aperture for receiving said post in said first housing, and means for securing said post in said aperture.

9. A dispenser according to claim 1 wherein said injection cartridge comprises:
   a cylinder with an axial opening at one end thereof;
   an axial valving rod movable into and out of said opening to open and close said cartridge to the flow of foamable compositions;
   a mixing chamber in said cylinder in fluid communication with said opening when said opening is opened by said valving rod; and
   a pair of openings on the circumference of said cylinder and in communication with said mixing chamber for permitting two separate foam precursor compositions to enter said cylinder, become mixed, and be dispensed as a foamable composition.

10. A dispenser according to claim 1 and further comprising:
    a first module comprising a first housing with said fluid flow fittings and said shutoff valve means in said first housing; and
    a second module comprising a second housing with said injection cartridge in said second housing for receiving fluid from said shutoff valve means and said fluid flow fitting; and
    means for securing said first and second modules to one another with said injection cartridge in fluid communication with said shutoff valve means and said fluid flow fitting so that foam precursors can travel from said foam fittings to said injection cartridge, and be dispensed from said cartridge to form foam.

11. A dispenser according to claim 1 wherein said fluid flow fitting comprise hose fittings.

12. A dispenser for dispensing foamable compositions and comprising:
    a housing with a fluid flow fitting that defines a fluid flow axis through said fitting;
    a shutoff valve in said housing, said shutoff valve having a respective fluid flow passage in fluid communication with said fluid flow fitting, and with said flow axis of said fluid passage in said shutoff valve being substantially coplanar with said flow axis of said fluid flow fitting in said housing; and
    an injection cartridge in said housing in fluid communication with said shutoff valve and said fluid flow fitting, said cartridge being positioned with its dispensing axis substantially coplanar with said axis of said fluid flow fitting in said housing and coplanar with said flow axis of said valve.

* * * * *